(12) United States Patent
Gao et al.

(10) Patent No.: US 8,844,397 B2
(45) Date of Patent: Sep. 30, 2014

(54) OIL FIELD PUMP UNIT HYBRID GEAR REDUCER

(71) Applicants: Weidong Gao, Walnut, CA (US); Liu Qiang, Xuzhou (CN)

(72) Inventors: Weidong Gao, Walnut, CA (US); Liu Qiang, Xuzhou (CN)

(*) Notice: Subject to any disclaimer, the term of this patent is extended or adjusted under 35 U.S.C. 154(b) by 0 days.

(21) Appl. No.: 13/789,350

(22) Filed: Mar. 7, 2013

(65) Prior Publication Data

US 2014/0190295 A1 Jul. 10, 2014

Related U.S. Application Data

(63) Continuation of application No. 13/737,864, filed on Jan. 9, 2013.

(51) Int. Cl.
*F16H 55/08* (2006.01)
*F16H 1/20* (2006.01)
*F16H 3/02* (2006.01)

(52) U.S. Cl.
CPC ... *F16H 3/02* (2013.01); *F16H 1/20* (2013.01)
USPC .......................................................... 74/462

(58) Field of Classification Search
CPC ..... B60W 20/00; B60W 10/10; B60W 10/11; B60W 30/19
USPC ............ 74/665 R, 457, 434, 413, 412 R, 335, 74/462; 475/5, 331
See application file for complete search history.

(56) References Cited

U.S. PATENT DOCUMENTS

| | | | | |
|---|---|---|---|---|
| 1,912,738 A * | 6/1933 | Svenson Ernest J | .......... | 417/440 |
| 5,181,431 A * | 1/1993 | Zaiser et al. | .................... | 74/333 |
| 5,248,286 A * | 9/1993 | Wilkinson et al. | .............. | 482/52 |
| 5,454,702 A * | 10/1995 | Weidhass | ................... | 418/206.5 |
| 6,709,250 B1 * | 3/2004 | Xiong | ......................... | 418/206.5 |
| 6,913,452 B2 * | 7/2005 | Heizer | ....................... | 418/201.1 |
| 8,312,785 B2 * | 11/2012 | Breeser et al. | .................. | 74/457 |
| 8,381,617 B2 * | 2/2013 | Holt et al. | ................... | 74/665 R |
| 8,500,414 B2 * | 8/2013 | Aregger | ....................... | 417/44.1 |
| 8,757,993 B2 * | 6/2014 | Sato | ........................... | 418/206.4 |
| 8,784,086 B2 * | 7/2014 | Smith et al. | ................. | 418/206.1 |
| 2012/0243991 A1* | 9/2012 | Han | .................................. | 416/9 |
| 2012/0289374 A1* | 11/2012 | Potter | .......................... | 475/296 |
| 2013/0324354 A1* | 12/2013 | Phebus et al. | ................. | 475/348 |

\* cited by examiner

*Primary Examiner* — Troy Chambers
*Assistant Examiner* — Jude Agendia
(74) *Attorney, Agent, or Firm* — Clement Cheng

(57) ABSTRACT

An oilfield pumping unit two-stage transmission gear reducer includes a low speed stage having a low speed shaft configured to receive motion from an intermediate shaft. A first gear pair includes a low speed shaft double circular arc gear mounted on the low speed shaft and configured to be driven by an intermediate shaft double circular arc gear mounted on the intermediate shaft. A high speed stage includes a high speed shaft configured to receive motion from an intermediate shaft. A second gear pair has a high speed shaft involute gear mounted on the high-speed shaft and configured to be driving an intermediate shaft involute gear mounted on the intermediate shaft.

4 Claims, 1 Drawing Sheet

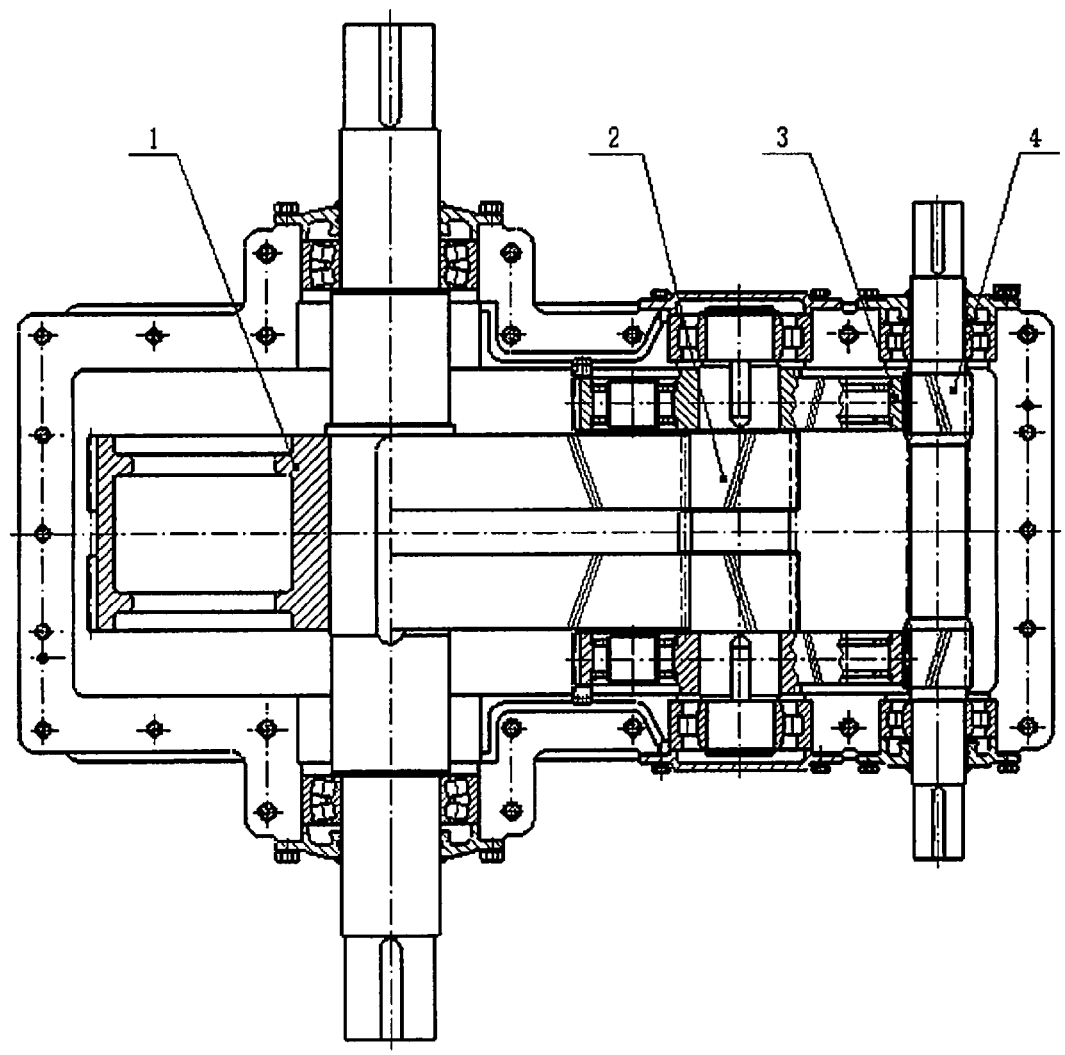

OIL FIELD PUMP UNIT HYBRID GEAR REDUCER

FIELD OF THE INVENTION

The present invention is in the field of oil field pump gear reducers, specifically a two stage gear reducer of a pumping unit working in an oil field.

DISCUSSION OF RELATED ART

Oilfield pump jacks pump oil and other liquids or gases from the ground. The reciprocating motion of the pump jack is driven by a motor. Oilfield pump jacks are reappearing and as oil price increases, America reenters a petroleum exploration era. Oilfields with small oil amounts are being developed. As some oilfields are located in or near residential areas, noise reduction becomes very important. To reduce the noise of the pumping unit to strict sound requirements a variety of different mechanical configurations can be used. A variety of different gear reducer configurations have been suggested in the prior art.

Also in the prior art is a substantial amount of literature regarding double circular arc (DCA) helical gears. One interesting publication for understanding cutting of double circular arc helical gears is entitled New Methods For Improved Double Circular Arc Helical Gears published by the National Aeronautics and Space Administration (contractor report 4771) prepared for the U.S. Army Research Laboratory by Faydor Litvin and Jian Lu 1997, the disclosure of which is incorporated herein by reference.

Traditionally, a pumpjack gear reducer typically has a double reduction double helical double circular arc gear that is attached to the oil well pumping unit for converting the high RPM and low torque motion of the motor to a low RPM high torque mechanical output. Unfortunately, this configuration is typically too loud for residential installation. Pumping unit gear reducers have used DCA gears for both a high speed and a low speed stage because of gear hob cutter limitations. However there has not been a reliable method to put double circular arc gears into grinding. Usually machining is performed by gear cutters and such machining may result in a rough surface. The high speed gear pair can be running at 500 rpm so that the high speed causes the DCA to generate loud noise if the surface contact is not finely finished.

SUMMARY OF THE INVENTION

The present invention is a hybrid oil field pump unit having a double circular arc gear combined with involute gear on the intermediate shaft. The present invention is therefore an oil field pump unit hybrid gear reducer which hybridizes a double circular arc gear with and involute gear to provide a mixed gear intermediate shaft configuration.

An oilfield pumping unit two-stage transmission gear reducer includes a low speed stage having a low speed shaft configured to receive motion from an intermediate shaft. A first gear pair includes a low speed shaft double circular arc gear mounted on the low speed shaft and configured to be driven by an intermediate speed shaft double circular arc gear mounted on the intermediate shaft. A high speed stage includes a high speed shaft configured to receive motion from an intermediate shaft. A second gear pair has a high speed shaft involute gear mounted on the high-speed shaft and configured to be driving an intermediate shaft involute gear mounted on the intermediate shaft.

The oilfield pumping unit two-stage transmission gear reducer may also have the high speed shaft involute gear having a lower number of teeth than the intermediate shaft involute gear. The intermediate speed shaft double circular arc gears has a lower number of teeth than the low speed shaft double circular arc gear. The intermediate shaft has a mixed gear profile comprising a mounting of the intermediate shaft double circular arc gears mounted between the intermediate shaft involute gears. The ends of the intermediate shaft are mounted to the casing side wall. The intermediate speed shaft double circular arc gear is about the same diameter as the intermediate speed shaft. The intermediate speed shaft double circular arc gear being approximately 0.15-15% greater in diameter than the intermediate shaft. The high speed shaft involute gear is about the same diameter as the high speed shaft, with the high speed shaft involute gear being approximately 0.15-15% greater in diameter than the high speed shaft.

BRIEF DESCRIPTION OF THE DRAWINGS

FIG. 1 is a top view cross section engineering drawing of the gear reducer showing assembly of the present invention.
The following callouts to the elements can be a useful guide to the elements of the drawings.
1 Driven Gear
2 Intermediate Shaft
3 Intermediate Shaft Involute Gear
4 Involute Driving Gear

DETAILED DESCRIPTION OF THE PREFERRED EMBODIMENT

A pumpjack has a gear reducer portion for converting a high revolutions per minute low torque motion of the motor to a low revolutions per minute high torque mechanical output to be transmitted to the walking beam and subsequently to the horse head and bridle. The gear reducer has a case for a housing that can be filled with oil and the gear reducer has shafts protruding from the case. The shafts are mounted on appropriate bearings.

The gear reducer high speed portion and the gear reducer low speed portion are connected in a gear train with a high speed shaft, a medium speed shaft and a low speed shaft. The high-speed shaft drives the medium speed shaft in a high-speed stage. The medium speed shaft drives the low-speed shaft in a low speed stage. The high speed shaft and the low speed shaft pass through the case, but the medium speed shaft has ends that are mounted to a side wall of the case.

According to FIG. 1, the gear reducer structure includes a low speed stage and a high speed stage. The low speed gear pair includes a driven gear 1 and intermediate gear 2, which is connected to the high speed stage. The high-speed stage includes the intermediate shaft involute gear 3 that meshes with and receives motion from the involute driving gear 4. Preferably, the driven gear has a pair of faces meshing with a pair of faces of the intermediate shaft involute gears. In the present invention, a single gear can be implemented as a double gear where the double gears are coaxial to each other.

The driven gear 1 meshes with the intermediate shaft 2 double circular arc gears. The driven gear connects to the high speed stage at the intermediate shaft. The high speed stage uses grinded involute gears preferably at a high level finish to reduce noise to a low level on the high speed stage. Thus, two different gear profiles are used in this gear reducer. The medium speed shaft has double circular arc gears for connecting to the low-speed shaft. The medium speed shaft also has involute gears for connecting to the high-speed shaft. Preferably, the double circular arc gears of the intermediate shaft are mounted between the intermediate shaft involute gears.

The pumping unit with the double circular arc gear for two-stage gear reducer can also be retrofitted. To realize this retrofitted transmission, it is possible to replace only the high-speed stage of the gear reducer train. The double circular arc gears rely on movement of the contact point along with the direction of a gear length. The circular arc gear is made by a once through gear hobbing, without polishing to a high degree of finish. The high stage gear has a high rate of rotation such that most noise comes from high speed stage. To ensure an optimal low machining cost and strength of contact surface of the driven gear 1, double circular arc gears should be adopted for the low speed stage. Using involute gearing on the high-speed stage while using double circular arc gears onto low speed stage should reduce noise by about 10 decibels when built according to the engineering blueprint of FIG. 1. The mixed gear profile has the involute gears on the outside and the double circular arc gears on the inside so that the double circular arc gears are mounted between involute gears.

As seen in FIG. 1, the low speed stage has a first gear pair including a low speed shaft double circular arc gear driven by an intermediate speed shaft double circular arc gear. Preferably, the intermediate speed shaft double circular arc gear is about the same diameter as the intermediate speed shaft, with the intermediate speed shaft double circular arc gear approximately 0.15-15% greater in diameter than the intermediate shaft. As seen in FIG. 1, a high speed stage has a second gear pair including a high speed shaft involute gear driving the intermediate shaft having an intermediate shaft involute gear. Preferably, the high speed shaft involute gear is about the same diameter as the high speed shaft, with the high speed shaft involute gear approximately 0.15-15% greater in diameter than the high speed shaft.

The invention claimed is:

1. An oilfield pumping method comprising the steps of:
   a. providing a pump jack having a pump jack two-stage transmission gear reducer;
   b. modifying the pump jack two-stage transmission gear reducer by:
      i. providing a low speed stage comprising: a low speed shaft; configuring the low speed shaft to receive motion from an intermediate shaft;
      ii. providing a first gear pair including a low speed shaft double circular arc gear; mounting the low-speed shaft double circular arc gear on the low speed shaft; and configuring the first gear pair to be driven by an intermediate speed shaft double circular arc gear mounted on the intermediate shaft; wherein the intermediate speed shaft double circular arc gear is approximately 0.15-15% greater in diameter than the intermediate shaft and
      iii. providing a high speed stage comprising: a high speed shaft; configuring the high-speed shaft to receive motion from the intermediate shaft; and
      iv. providing a second gear pair including a high speed shaft involute gear mounted on the high-speed shaft; and configuring the high-speed shaft involute gear to be driving an intermediate shaft involute gear mounted on the intermediate shaft wherein the high speed shaft involute gear is approximately 0.15-15% greater in diameter than the high speed shaft.

2. The oilfield pumping method of claim 1, further comprising the steps of:
   wherein the intermediate shaft has a mixed gear profile comprising a mounting of the intermediate shaft double circular arc gears mounted between the intermediate shaft involute gears.

3. The oilfield pumping method of claim 1, further comprising the steps of:
   providing the high speed shaft involute gear with a lower number of teeth than the intermediate shaft involute gear; and providing the intermediate shaft double circular arc gear with a lower number of teeth than the low speed shaft double circular arc gear.

4. The oilfield pumping method of claim 3, further comprising the step of:
   mounting the ends of the intermediate shaft to the casing side wall.

* * * * *